US011393648B2

(12) United States Patent
Yeong et al.

(10) Patent No.: US 11,393,648 B2
(45) Date of Patent: Jul. 19, 2022

(54) AUTOMATIC CONFIGURABLE RELAY

(71) Applicant: Schneider Electric Industries SAS, Rueil Malmaison (FR)

(72) Inventors: Ya Chee Yeong, Singapore (SG); Liew Yew Loung, Singapore (SG)

(73) Assignee: Schneider Electric Logistics Asia PTE LTD., Singapore (SG)

( * ) Notice: Subject to any disclaimer, the term of this patent is extended or adjusted under 35 U.S.C. 154(b) by 191 days.

(21) Appl. No.: 13/656,057

(22) Filed: Oct. 19, 2012

(65) Prior Publication Data

US 2013/0249316 A1 Sep. 26, 2013

(30) Foreign Application Priority Data

Oct. 21, 2011 (SG) ................................ 201107780-7

(51) Int. Cl.

| | |
|---|---|
| ***H02H 3/00*** | (2006.01) |
| ***H01H 47/00*** | (2006.01) |
| ***H01H 71/00*** | (2006.01) |
| *H01H 71/74* | (2006.01) |

(52) U.S. Cl.

CPC .......... *H01H 47/002* (2013.01); *H01H 71/00* (2013.01); *H01H 71/74* (2013.01); *H01H 2071/006* (2013.01)

(58) Field of Classification Search

CPC . H02H 3/00; H04L 7/00; H01H 47/00; H01H 47/002; G08B 21/00; G06F 15/173; G06F 1/28; G05D 11/00; G01R 19/00; H02P 9/04; F02D 29/06

USPC .................. 307/125, 126, 112, 38, 116, 140; 361/170, 63, 601, 622; 709/223; 713/340

See application file for complete search history.

(56) References Cited

U.S. PATENT DOCUMENTS

| | | | | |
|---|---|---|---|---|
| 4,562,550 | A * | 12/1985 | Beatty ................ | H02J 13/0086 700/295 |
| 5,185,705 | A | 2/1993 | Farrington | |
| 5,224,011 | A | 6/1993 | Yalla et al. | |
| 6,285,292 | B1 | 9/2001 | Suptitz et al. | |
| 6,292,717 | B1 | 9/2001 | Alexander et al. | |
| 7,099,934 | B1 * | 8/2006 | Ewing et al. ................ | 709/223 |

(Continued)

FOREIGN PATENT DOCUMENTS

| | | |
|---|---|---|
| CN | 1288277 A | 3/2001 |
| CN | 1645702 A | 7/2005 |

(Continued)

OTHER PUBLICATIONS

First Office Action, dated Aug. 4, 2014, in counterpart Chinese Patent Application No. 201210403015.3 (With English-language Translation thereof).

(Continued)

*Primary Examiner* — Rexford N Barnie
*Assistant Examiner* — Terrence R Willoughby
(74) *Attorney, Agent, or Firm* — Haug Partners LLP

(57) ABSTRACT

An automatic configurable relay and a method for automatically configuring a relay. The relay comprises an input sampling module for coupling to a source to be monitored, the sampling module configured to detect a first value of a parameter of the source to be monitored; and a processing module configured to set a working condition based on the detected first value.

20 Claims, 6 Drawing Sheets

(56) References Cited

U.S. PATENT DOCUMENTS

| | | | | |
|---|---|---|---|---|
| 2004/0130839 | A1* | 7/2004 | Bo | H02H 7/30 361/92 |
| 2005/0162788 | A1 | 7/2005 | Boudaud | |
| 2009/0115620 | A1* | 5/2009 | Hunter | H02H 3/006 340/664 |
| 2009/0231153 | A1* | 9/2009 | Hauenstein | G01H 1/003 340/683 |
| 2011/0063766 | A1* | 3/2011 | Kasztenny | H02H 3/30 361/63 |
| 2011/0282507 | A1* | 11/2011 | Oudalov | H02H 3/006 700/292 |
| 2012/0057266 | A1* | 3/2012 | Kasztenny | H02H 3/04 361/170 |
| 2012/0081824 | A1* | 4/2012 | Narendra | H02H 3/46 361/86 |
| 2012/0212872 | A1* | 8/2012 | Padmanabh | H02H 3/08 361/93.6 |

FOREIGN PATENT DOCUMENTS

| | | | |
|---|---|---|---|
| CN | 102110555 | A | 6/2011 |
| EP | 0949734 | A2 | 10/1999 |

OTHER PUBLICATIONS

Extended European Search Report (including European search report and search opinion) dated Mar. 14, 2013 in counterpart European Application No. EP12188618.8.

EPO Official Communication, dated Jan. 25, 2017, in counterpart European Patent Application No. 12 188 618.8 (4 pages).

* cited by examiner

AUTOMATIC CONFIGURABLE RELAY

CROSS-REFERENCE TO RELATED APPLICATIONS

This application is based upon and claims the benefit of priority from the corresponding Singapore Patent Application No. 201107780-7 filed on Oct. 21, 2011, which is incorporated herein by reference in its entirety.

TECHNICAL FIELD

The present disclosure relates broadly to an automatic configurable relay and to a method for automatic configuration of a relay.

BACKGROUND

In the electronics industry, devices such as relays are typically used to operate machinery and circuits. Such devices typically rely on energisation or switching on/off for operations.

For monitoring or control operations using a control relay, typically, a user manually sets parameters to be monitored by the relay. Parameters may include nominal operating voltage range, over voltage limit, under voltage limit, time delay, phase asymmetry threshold and etc. The parameters are calculated from a desired working/operating condition which the user also manually programs into the relay. For example, if a user sets the working condition of a power supply as 240 V and an overvoltage tolerance of 5%, such setting causes the relay to calculate an overvoltage limit of 252 V. As a result, the relay switches on/off when the monitored voltage level meets the calculated limit. As a further example, if a user sets a voltage range to 400 V, an under-voltage limit to 300 V, an over-voltage limit to 440 V, an asymmetry limit to 30 V and a time-setting to 5 seconds, these settings would instruct the relay to monitor whether any one of the following situations occurs, including whether the parameter is less than 300 V or more than 440 V, or the difference of voltage between 3-phase leads is more than 30 V. If any condition is met, the relay de-energizes after delaying for a time-delay of 5 seconds. Thus, in order to ensure that the relay is properly set, the user is expected to have knowledge of the relay, working condition, and functions associated with the parameters. This typically requires the user to constantly refer to manuals or specifications, e.g. for setting the desired working condition. Furthermore, a wrong setting of the working condition has been found to result in numerous erroneous malfunction reports. There have also been instances of erroneous reports in scenarios whereby the parameter is already not fulfilling the conditions set by the user due to wrong user knowledge.

The present disclosure is directed to an automatic configurable relay and a method for automatically configuring a relay that seek to overcome the above-described disadvantages of traditional relays.

SUMMARY

In accordance with a first aspect of some embodiments of the present disclosure, there is provided a relay comprising an input sampling module for coupling to a source to be monitored, the sampling module configured to detect a first value of a parameter of the source to be monitored; and a processing module configured to set a working condition based on the detected first value.

According to some embodiments as set forth in the present disclosure, the processing module is configured to monitor a working range generated based on applying a threshold level to the set working condition; and wherein the processing module is capable of instructing a trigger module for transmitting a trigger signal when a detected second value of the parameter is outside the working range.

According to some embodiments as set forth in the present disclosure, the parameter may comprise one or more parameter selected from a group consisting of three phase voltage, single phase voltage, single phase current, phase angle, phase frequency, power, temperature, resistance, and digital signals.

According to some embodiments as set forth in the present disclosure, the relay may further comprise a switch element, and wherein the trigger signal switches on/off the switch element of the relay.

According to some embodiments as set forth in the present disclosure, the threshold level is set by a user.

According to some embodiments as set forth in the present disclosure, the threshold level is set based on a predetermined value.

According to some embodiments as set forth in the present disclosure, the processing module may set the working condition based on an instructional input.

According to some embodiments as set forth in the present disclosure, the instructional input may be based on a user activation.

According to some embodiments as set forth in the present disclosure, the instructional input may be based on a powering up of the relay.

According to some embodiments as set forth in the present disclosure, the relay may further comprise a toggle configured to allow a user to adjust the working condition.

According to some embodiments as set forth in the present disclosure, the relay may further comprise a display configured to display a fault based on the trigger signal.

According to some embodiments as set forth in the present disclosure, the relay may further comprise a storage module for storing the set working condition.

In accordance with a second aspect of some embodiments of the present disclosure, there is provided a method for automatic configuration of a relay, the method comprising coupling the relay to a source to be monitored; automatically detecting a first value of a parameter of the source; and setting a working condition based on the detected first value.

According to some embodiments as set forth in the present disclosure, the method may further comprise monitoring a working range generated based on applying a threshold level to the set working condition; and transmitting a trigger signal when a detected second value of the parameter is outside the working range.

According to some embodiments as set forth in the present disclosure, the parameter may comprise one or more parameter selected from a group consisting of three phase voltage, single phase voltage, single phase current, phase angle, phase frequency, power, temperature, resistance, and digital signals.

According to some embodiments as set forth in the present disclosure, the transmitting the trigger signal switches on/off a switch element of the relay.

According to some embodiments as set forth in the present disclosure, the threshold level is set by a user.

According to some embodiments as set forth in the present disclosure, the threshold level is set based on a predetermined value.

According to some embodiments as set forth in the present disclosure, the setting of the working condition may be based on an instructional input.

According to some embodiments as set forth in the present disclosure, the instructional input may be based on a user activation.

According to some embodiments as set forth in the present disclosure, the instructional input may be based on a powering up of the relay.

According to some embodiments as set forth in the present disclosure, the method may further comprise displaying a fault based on transmission of the trigger signal.

According to some embodiments as set forth in the present disclosure, the method may further comprise storing the set working condition.

In accordance with a third aspect of some embodiments of the present invention, there is provided a non-transitory computer readable data storage medium having stored thereon computer code means for instructing a processing module of a relay to execute the above-described method.

According to some embodiments as set forth in the present disclosure, the non-transitory computer readable data storage medium may have the method further comprising monitoring a working range generated based on applying a threshold level to the set working condition; and transmitting a trigger signal when a detected second value of the parameter is outside the working range.

It is understood that the foregoing summary is representative of some embodiments of the present disclosure, and is neither representative nor inclusive of all subject matter and embodiments within the scope of the present disclosure. It is further understood that in the foregoing summary references to various features being preferable and/or being comparatively preferable (e.g., more preferably, even more preferably, etc.) are applicable to various embodiments or implementations and do not imply that such preferences and/or comparative preferences are applicable to all embodiments, and thus should not be limiting or restrictive of the present disclosure as claimed. Additionally, it will be appreciated by those skilled in the art that the foregoing brief description and the following detailed description are exemplary and explanatory of some embodiments of the present disclosure, but are not intended to be restrictive of the present disclosure or limiting of the advantages which it can achieve in various implementations.

BRIEF DESCRIPTION OF THE DRAWINGS

Aspects, features, and advantages of some embodiments of the present disclosure, both as to structure and operation, will be understood and will become more readily apparent when the present disclosure is considered in the light of the following description made in conjunction with the accompanying drawings, in which like reference numerals designate the same or similar parts throughout the various figures. Example embodiments of the present disclosure will be better understood and readily apparent to one of ordinary skill in the art from the following written description, by way of example only, and in conjunction with the drawings, in which:

FIG. 1(*b*) shows a schematic circuit diagram illustrating the relay in the example embodiment.

DETAILED DESCRIPTION

Figure 1A:
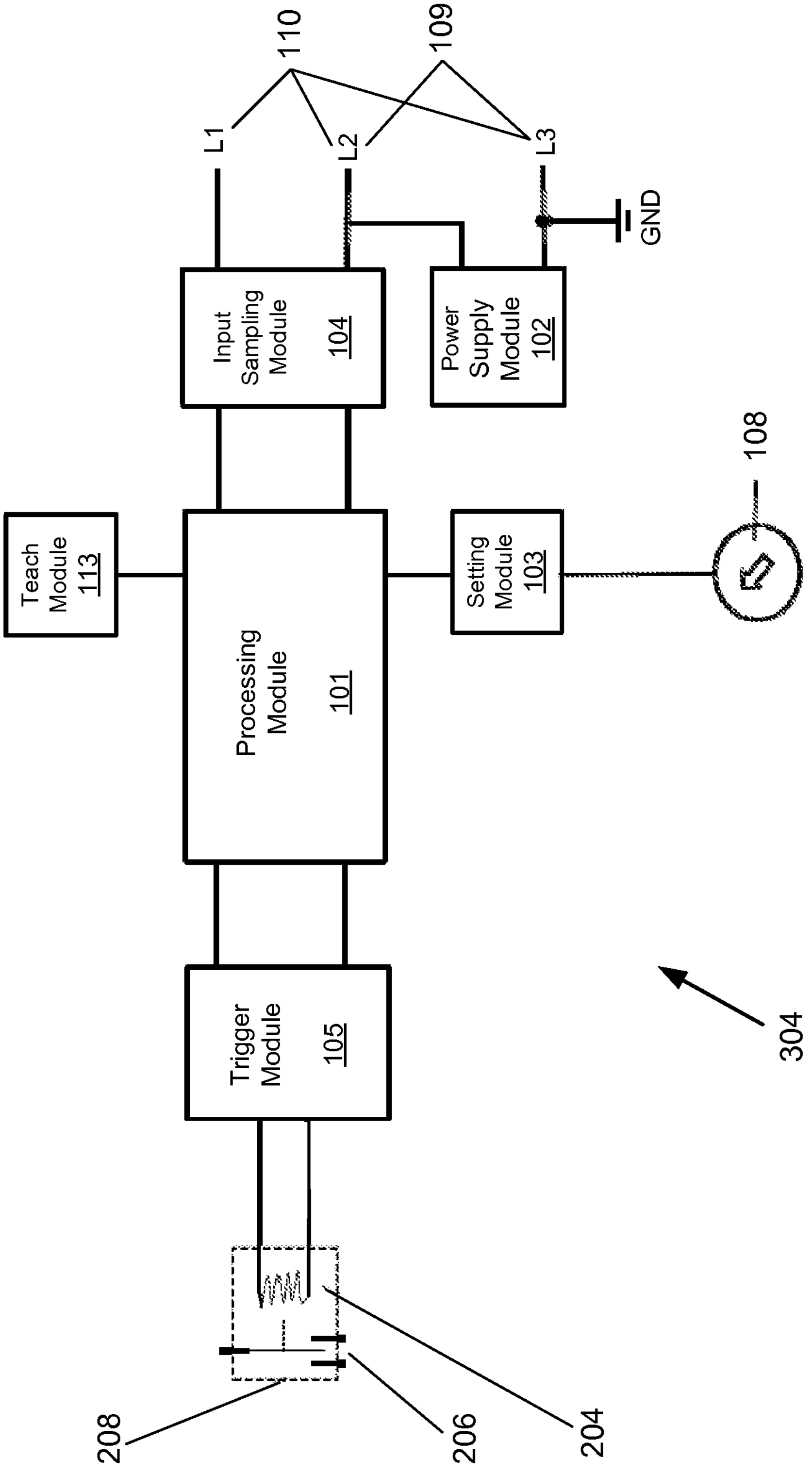
FIG. 1(*a*) shows a schematic diagram illustrating a relay in an example embodiment.

Example embodiments described below can provide an automatic configurable relay and a method for automatic configuration of a relay.

In example embodiments, a relay can be provided to detect a parameter value of a source to be monitored and to automatically set the detected value as a working condition for the relay. The relay can access pre-set or user-set one or more threshold levels and apply the threshold levels to the working condition to obtain a working range. The relay monitors parameter values of the source to be monitored against the working range and if the value is outside the working range, a trigger signal is transmitted. In one example embodiment, the trigger signal comprises energising or de-energising (e.g. switching on or switching off) a switch element of the relay. In one example embodiment, a toggle, e.g. in the form of a slidable door, is provided to a user to toggle between an "auto-setting configuration mode" or a conventional "manual-setting configuration mode". In the example embodiment, when the user slides to the "auto-setting configuration mode", settings of e.g. a voltage range, an over-voltage limit, an under-voltage limit, an asymmetry limit and/or a time setting can be automatically configured for the relay. In the example embodiment, this is carried out by the relay self detecting at least a value of one or more input parameters through an input module and processing the detected values to self-recognize settings of a voltage range, pre-set over-voltage limit, under-voltage limit, asymmetry limit and time setting. After the working range is set, the relay can monitor the parameter values.

In the description herein, a relay can be an energisable coil device that can include, but is not limited to, any device that can be switched/powered on and off such as an electrical relay or other electromechanical switching devices, components or parts. An energisation event of an energisable coil device can include, but is not limited to, an electrical powering on/off of the element and/or a mechanical switching on/off of the element.

The terms "coupled" or "connected" as used in this description are intended to cover both directly connected or connected through one or more intermediate means, unless otherwise stated.

The description herein may be, in certain portions, explicitly or implicitly described as algorithms and/or functional operations that operate on data within a computer memory or an electronic circuit. These algorithmic descriptions and/or functional operations are usually used by those skilled in the information/data processing arts for efficient description. An algorithm is generally relating to a self-consistent sequence of steps leading to a desired result. The algorithmic steps can include physical manipulations of physical quantities, such as electrical, magnetic or optical signals capable of being stored, transmitted, transferred, combined, compared, and otherwise manipulated.

Further, unless specifically stated otherwise, and would ordinarily be apparent from the following, a person skilled in the art will appreciate that throughout the present specification, discussions utilizing terms such as "scanning", "calculating", "determining", "replacing", "generating", "initializing", "outputting", and the like, refer to action and processes of a instructing processor/computer system, or similar electronic circuit/device/component, that manipulates/processes and transforms data represented as physical quantities within the described system into other data similarly represented as physical quantities within the system or other information storage, transmission or display devices etc.

The description also discloses relevant device/apparatus for performing the steps of the described methods. Such apparatus may be specifically constructed for the purposes of the methods, or may comprise a general purpose computer/processor or other device selectively activated or reconfigured by a computer program stored in a storage member. The algorithms and displays described herein are not inherently related to any particular computer or other apparatus. It is understood that general purpose devices/machines may be used in accordance with the teachings herein. Alternatively, the construction of a specialized device/apparatus to perform the method steps may be desired.

In addition, it is submitted that the description also implicitly covers a computer program, in that it would be clear that the steps of the methods described herein may be put into effect by computer code. It will be appreciated that a large variety of programming languages and coding can be used to implement the teachings of the description herein. Moreover, the computer program if applicable is not limited to any particular control flow and can use different control flows without departing from the scope of the invention.

Furthermore, one or more of the steps of the computer program if applicable may be performed in parallel and/or sequentially. Such a computer program if applicable may be stored on any computer readable medium. The computer readable medium may include storage devices such as magnetic or optical disks, memory chips, or other storage devices suitable for interfacing with a suitable reader/general purpose computer. The computer readable medium may even include a wired medium such as exemplified in the Internet system, or wireless medium such as exemplified in bluetooth technology. The computer program when loaded and executed on a suitable reader effectively results in an apparatus that can implement the steps of the described methods.

The example embodiments may also be implemented as hardware modules. A module is a functional hardware unit designed for use with other components or modules. For example, a module may be implemented using digital or discrete electronic components, or it can form a portion of an entire electronic circuit such as an Application Specific Integrated Circuit (ASIC). A person skilled in the art will understand that the example embodiments can also be implemented as a combination of hardware and software modules.

Figure 1B:
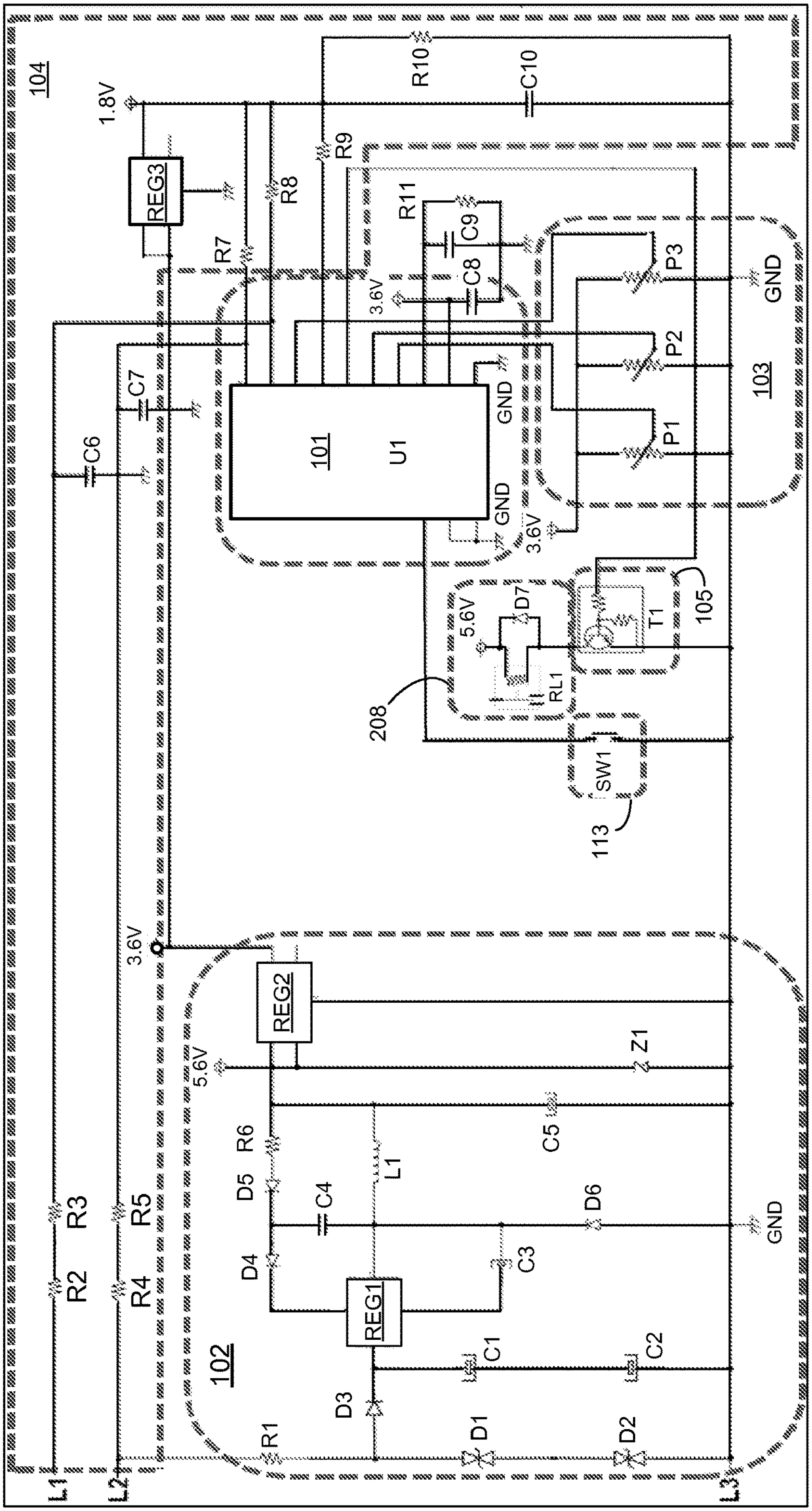

FIG. 1(*a*) shows a schematic diagram illustrating a relay in an example embodiment. In the example embodiment, the relay is a control relay 100. The relay 100 is configured to be coupled to a source to be monitored such as a three-phase power supply line voltage source 110. The relay 100 can detect values of one or more parameters of the source to be monitored.

FIG. 1(*b*) shows a schematic circuit diagram illustrating the relay 100 in the example embodiment.

In the example embodiment, the relay 100 comprises an input sampling module 104 coupled to a processing module 101. The processing module 101 is coupled to a setting module 103 that is in turn coupled to a user interface 108. The processing module 101 is further coupled to a trigger module 105 that can control a switch element 208 of the relay 100. The input sampling module 104 can couple to the source 110 using e.g. leads L1, L2, and L3. A power supply module 102 is provided to supply power to the various components of the relay 100. The relay 100 may optionally comprise a teach module 113 coupled to the processing module 101 for instructing the processing module 101 to obtain a present sensed parameter as a working condition. The relay 100 may also be coupled to a programmable logic controller 114 for feedback.

In the example embodiment, the source 110 is not limited to a three-phase voltage and can include various parameters for sources to be monitored such as single phase voltage, single phase current, temperature (obtained from e.g. temperature sensors such as PT100, PTC, or thermocouplers), electrical signals associated with frequency characteristics, resistance (obtained from e.g. resistor probes for liquid level sensing), and digital signals (obtained from e.g. digital output sensors such as ultrasonic sensors, photo sensors, inductive sensors, and pressure sensors). Other parameters such as phase angle or power of a three-phase power supply may also be monitored. Accordingly, the relay 100 is not limited to monitoring power source parameters but may be adapted to monitor temperature, liquid level, speed, pressure, light, and other parameters that are suitable to be monitored.

According to some embodiments of the present disclosure as shown in FIG. 1(*b*), the input sampling module 104 comprises a plurality of resistors e.g. R2, R3, R4, R5, R7, R8, R9, and R10 and a linear voltage regulator REG3 which regulates voltage at about 1.8V. REG3 can be implemented using e.g. TPS72118DBVR from Texas Instruments. Capacitors e.g. C6, C7, and C10 are included for noise filtering purposes. The input sampling module 104 steps down and shifts a voltage level of the 3 phase voltage from the input source 110 to a voltage level suitable to be processed by the processing module 101. It will be appreciated that the sampling module 104 can have different circuit arrangements in order to adapt to various kinds of physical input parameters from different sources 110.

The processing module 101 accepts inputs from the input sampling module 104 and conducts processing. In the example embodiment, the processing module 101 can accept a sampled parameter value (e.g. the voltage level) sampled at the input sampling module 104 as a working condition for the relay 100. For example, the sampled parameter value may be a voltage of 240V. In the example embodiment, the processing module 101 may set the working condition as 240V automatically. The processing module 101 can also compare a sampled parameter value (e.g. the voltage level) sampled at the input sampling module 104 with a working range for the relay 100.

According to some embodiments of the present disclosure as shown in FIG. 1(*b*), the processing module 101 can comprise a microcontroller U1. U1 can be implemented using e.g. STM32F100C from STMicroelectronics or LPC1114 from NXP. Other components may be provided connected to the microcontroller as a supporting circuit to enable the microcontroller to function. It will be appreciated that the supporting circuit can be rearranged or altered depending on the type of microcontroller selected for implementation. In the example embodiment, the processing module 101 functions as an intelligent process element that interacts with the components within the relay 100. Processing in the processing module 101 is dependent on the firmware recorded in the processing module 101.

According to some embodiments of the present disclosure as shown in FIG. 1(*b*), the user interface 108 can comprise external manipulated elements to be accessed by a user of the relay 100. The manipulation or setting set by the user on the user interface 108 is sensed by the setting module 103 and is translated into an electrical signal at the setting module 103. The signal is transmitted to the processing module 101 for processing at the processing module 101.

Various types of manipulation or settings can be used in the relay 100 depending on the type of relay 100. In this example, possible manipulation or setting can include voltage range selection setting, under-voltage setting, and over-voltage setting. Asymmetry setting can be included as well. Asymmetry setting includes different setting for a high level and a low level. For example, in an asymmetry setting, a high level may have a setting of 120 V with +10% tolerance, while a low level may have a setting of 20 V with −5% tolerance. In an alternative example embodiment, for a relay 100 that monitors frequency as a physical input type, possible manipulation or setting to be done by a user can include under-temperature setting and over-temperature setting. The settings provide one or more threshold levels or "sets of conditions" that the relay 100 uses at the processing module 101 in order to determine whether the parameter values sampled at the source at numeral 110 fall within a working range based on these "sets of conditions".

According to some embodiments of the present disclosure as shown in FIG. 1(*b*), the setting module 103 comprises a plurality of converters such as a plurality of potentiometers P1, P2, and P3 for converting the setting set by the user at the user interface 108 to an electrical signal that can be transmitted and recognized by the processing module 101. The plurality of converters work coordinate with each other, and each has a dedicated function. For example, P1 can translate a selection of nominal voltage range selected by the user (e.g. 200V, 220V, 380V, 400V, 440V, and 480V); P2 can translate an over-voltage user setting; and P3 can translate an under-voltage user setting. It will be appreciated that the setting module 103 is not limited as such and can be expanded to more settings such as asymmetry, time setting etc.

Therefore, in the example embodiment, the processing module 101 can set a working condition based on input from the input sampling module 104. According to another embodiment, the processing module 101 can set a working range based on applying the one or more threshold levels to the working condition, the threshold levels supplied via the setting module 103. If a monitored value of the parameter of the source to be monitored falls outside the working range, a trigger signal is transmitted. The trigger signal can be transmitted by the processing module 101 by instructing the trigger module 105 to control the switch element 108.

The trigger module 105 comprises a controlling unit coupled with a switch. For example, as shown in FIG. 1(*b*), the trigger module comprises a transistor T1 for driving or controlling the switch element 208. In the example embodiment, when T1 is turned ON, the switch element 208 is energized or switched on. When T1 is turned OFF, the switch element 208 is de-energized or switched off. It will be appreciated that there are various possibilities to modify the design and/or to reverse the above logic depending on designer preference. The trigger signal can be a feedback signal to a programmable logic controller 114 for alerting the user.

In the example embodiment as shown in FIG. 1(*a*), the switch element 208 can be constructed as an electro-mechanical relay switch. The switch element 208 comprises a coil portion 204 and a contact portion 206. The coil portion 204 can be energized or de-energized by the trigger module 105 in order to switch the position or logic of the contact portion 206. It will be appreciated that the switch element can be any of electro-mechanical relay or solid-state switch.

In the example embodiment, the power supply module 102 functions as a power supply circuit of the relay 100. The power supply module 102 steps down and regulates an external power supply 109 provided to the relay 100 to a voltage supply level that is suitable for the components in the relay 100. In the example embodiment as shown in FIG. 1(*b*), the power supply module 102 comprises a switching regulator integrated circuit REG1. REG1 can be implemented using e.g. NCP1052ST44T3G from ON Semi. Diodes D3, D6, an inductor L1, zener diode Z1, and capacitors C5, C1, C2 provide a construction of a buck-converter. Diodes D4, D5, resistor R6, and capacitor C4 function as a feedback circuit for REG1, and functions to sample a regulated output voltage at about +5.6V in order to be able to achieve a voltage regulation purpose. A capacitor C3 is provided as a start-up element for REG1 when the power supply is initially provided to the relay 100. A resistor R1 and diodes D1, D2 function as a circuit for transient voltage protection. The power supply module 102 also comprises a linear voltage regulator REG2 which regulates voltage at about 3.6V. REG2 may be implemented as e.g. 3.6V voltage regulator LD2981ABM36TR from STMicroelectronics.

With reference to FIG. 1(*a*), numeral 109 at leads L2, L3 denotes an external source of supply voltage for the relay 100. In this example of FIG. 1, the source of supply voltage to the power supply module 102 is the same physical input as that coupled to the input sampling module 104 (i.e. at leads L2, L3). However, it will be appreciated that it is not necessary that the source of supply voltage to be the same as the input to the relay 100.

As described, a teach module 113 can be optionally included in the relay 100. The teach module 113 can be provided for instructing the processing module 101 to obtain a present sensed parameter value as a working condition. In such a scenario, the processing module 101 ignores previously sensed values and sets a new working condition. Additionally, the teach module 113 can function to inform the processing module 101 on whether to enter into an auto-detection mode or into a manual setting mode. It will be appreciated that the teach module 113 can be any electronics or electro-mechanical switch that functions to e.g. reset the processing module 101 and/or to inform the processing module 101 on a selected mode.

In the example embodiment, optionally, a storage element or memory (not shown) may be provided. The memory can store all the information related to the parameters detected at the input sampling module 104. For example, the memory can store all instantaneous information of a 3 phase voltage, the information including instantaneous voltage level, historical voltage level, frequency, and historical faults that had happened. The memory can be, but not limited to, an external memory module such as EEPROM, FLASH, PROM etc., or an integrated memory circuit embedded into the processing module 101.

In the example embodiment, optionally, a transceiver integrated circuit 115 can be provided. The transceiver integrated circuit can transmit and receive information wirelessly or through a wired-medium to and from the relay 100, in communication with external devices such as a mobile phone, a computer, and/or a programmable logic controller. The transceiver integrated circuit can be, but not limited to, a Bluetooth transceiver, a Wifi transceiver, a Zigbee transceiver, a universal serial bus (USB) transceiver, and a Serial Port transceiver.

Therefore, in the example embodiment, the relay 100 can function as a control & monitoring device for monitoring physical input parameters and for automatically determining the condition of the physical input parameters, i.e. whether the parameters are meeting one or more threshold levels set by a user. The relay 100 can reflect that status in various terms, such as a digital form/feedback or a visual feedback. This may be a trigger signal in terms of "closing a contact" or "opening a contact" if the switch element 208 is an electro-mechanical relay or in terms of "ON" or "OFF" if the switch element 208 is a solid-state switch. The relay 100 can be powered by a separate source of supply voltage or share the same source of supply voltage as the physical input parameters of the source to be monitored. In the example embodiment, the power source is preferably a three phase power source, although other kinds of power sources may also be used. It will be appreciated that the power source may be either an alternating current (AC) or direct current (DC) power.

Figure 2:
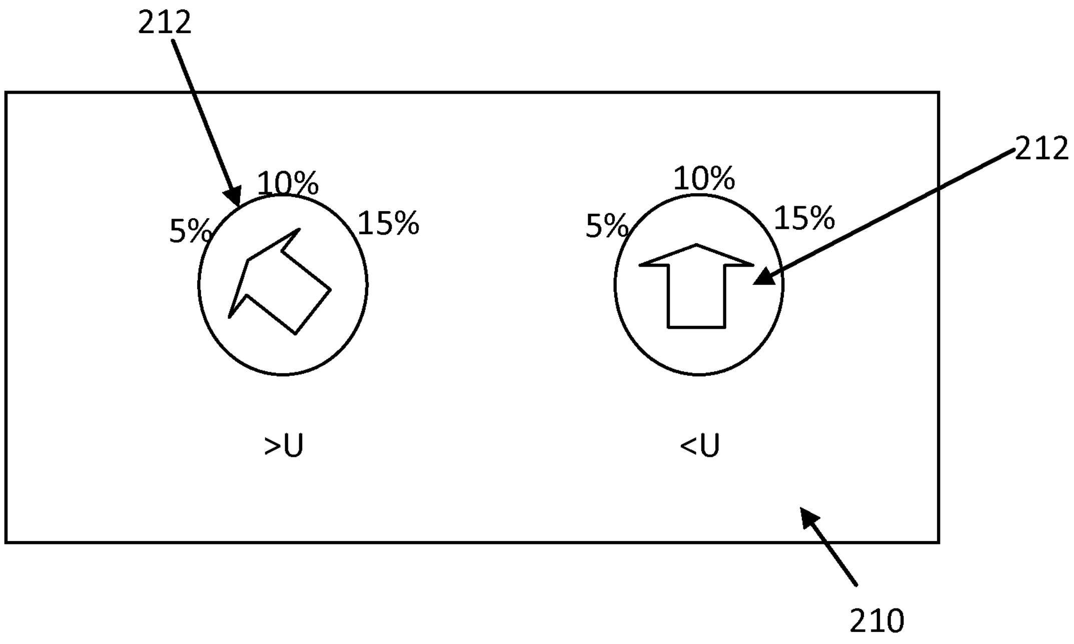
FIG. 2 shows a schematic diagram illustrating an interface allowing a user to set threshold levels in an example embodiment.

FIG. 2 shows a schematic diagram illustrating an interface allowing a user to set threshold levels in an example embodiment. The interface 210 comprises one or more setting elements such as one or more potentiometers e.g. 212. The user can manipulate a potentiometer e.g. 212 for setting a threshold such as an overvoltage of about 5%, 10%, or 15%. Thus, if the monitored voltage at numeral 110 exceeds 5% of the normal working condition, a fault needs to be reported. According to some embodiments, the interface 210 includes two setting elements: one element is used for a low level setting and the other is used for a high level setting.

In an example embodiment, if a storage module is provided, the working condition information can be stored for future use. Further, an actuator such as a button and/or a sliding door can be provided to a teach module 113 so that a user can manipulate the actuator to send an instructional input for instructing the relay 100 to access a present detected parameter value for determining/setting the working condition, and to disregard any previous stored working condition information. As yet in another embodiment, the relay 100 can be instructed to use the detected value obtained when the relay 100 is powered up as the working condition. Accordingly, each initial detection of a power supply to the relay acts as an instructional input.

In an example embodiment, the trigger signal can also function to send a visual indication/display to a user. For example, the trigger signal can be transmitted to a light emitting diode (LED) circuit that instructs an LED to be lit when a corresponding parameter is detected to have a value outside its determined working range. For example, an overvoltage LED may be lit if a detected voltage level is determined to be outside a work rang, e.g. a 5% tolerance from a working condition for the voltage, and an overcurrent LED may be lit if a detect current level is determined to be outside a work range, e.g. 2% tolerance from a working condition for the current.

Thus, in the described example embodiments, the relay 100 is capable of setting a working condition based on a detected value of a parameter of a source to be monitored.

A working range can then be set based on applying a threshold level to the set working condition. If another detected value of the parameter is outside the working range, a trigger signal can be sent from the relay. This may cause a visual indication displayed to the user.

Figure 3:
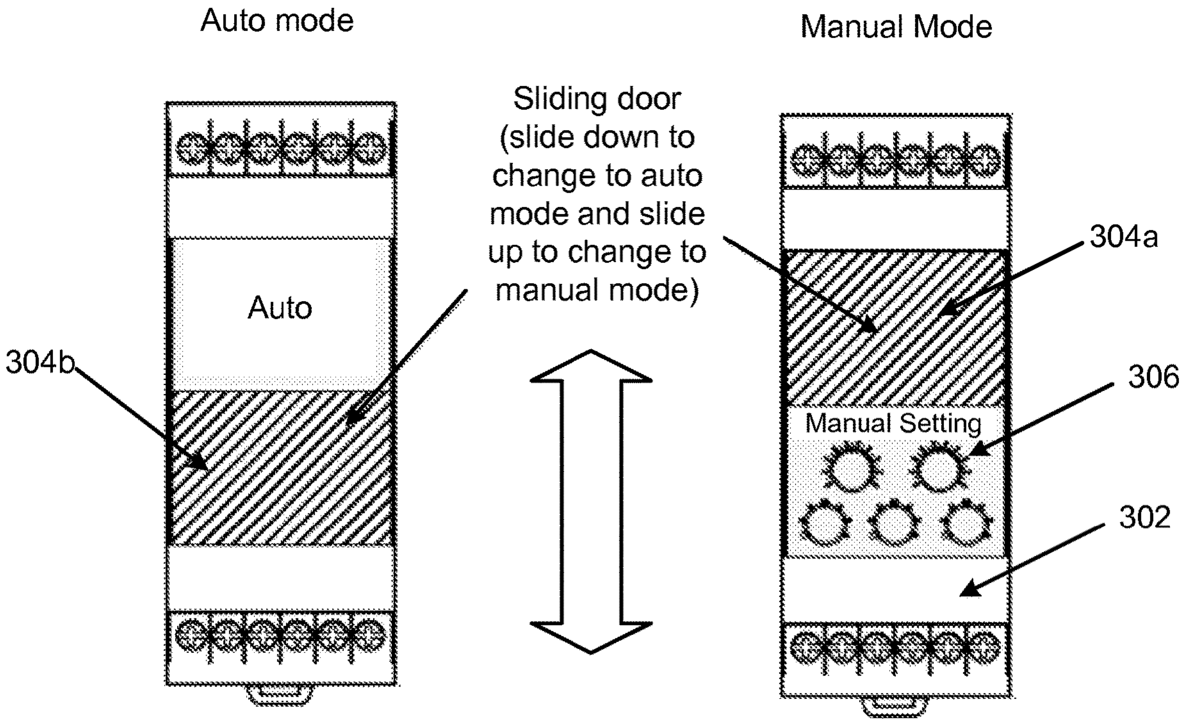
FIG. 3 shows a schematic diagram illustrating a relay in an example embodiment.

FIG. 3 shows a schematic diagram illustrating a relay 302 in an example embodiment. The relay 302 has functions similar to those of the relay 100 in FIGS. 1(*a*) and 1(*b*). The relay 302 additionally comprises a toggle 304 in the form of a sliding door. The toggle 304 can allow a user to switch the relay 302 between a manual mode and an auto mode. For example, when the toggle 304 is set to a manual mode 304(*a*) in FIG. 3 by sliding the toggle 304 to an upper position, a user can use a set of manual controls 306 disposed at a lower position for manually adjusting/fine-tuning the working condition and/or threshold levels. It will be appreciated that the toggle 304 is not limited to a sliding door but can include various other forms such as switches, buttons, sliding members and even finger swipe gestures on a touch screen surface. The toggle 304 is coupled to a teaching module 113 of the relay 302.

When the toggle 304 is set to an auto mode 304(*b*) in FIG. 3 by sliding the toggle 304 to the lower position, the threshold levels are set automatically and stored in a storage module, i.e. predetermined threshold levels. When the relay 302 is in an auto mode, the relay 302 may show an indication to a user that the relay is in an auto mode. For example, a label showing the text of "Auto" may be shown in the upper position of the relay 302. Similarly, in a manual mode, the relay 302 may show a text of "Manual" to the user. The stored values may be in the form of a lookup table. In this example embodiment, a pre-set tolerance may be provided for each expected value of a parameter of the source to be monitored. For example, it may be stored that for a detected 240 V to be set as a working condition, the pre-set tolerance for overvoltage may be 5% and for a detected 300 V to be set as a working condition, and the pre-set tolerance for overvoltage may be 10% etc.

Figure 5:
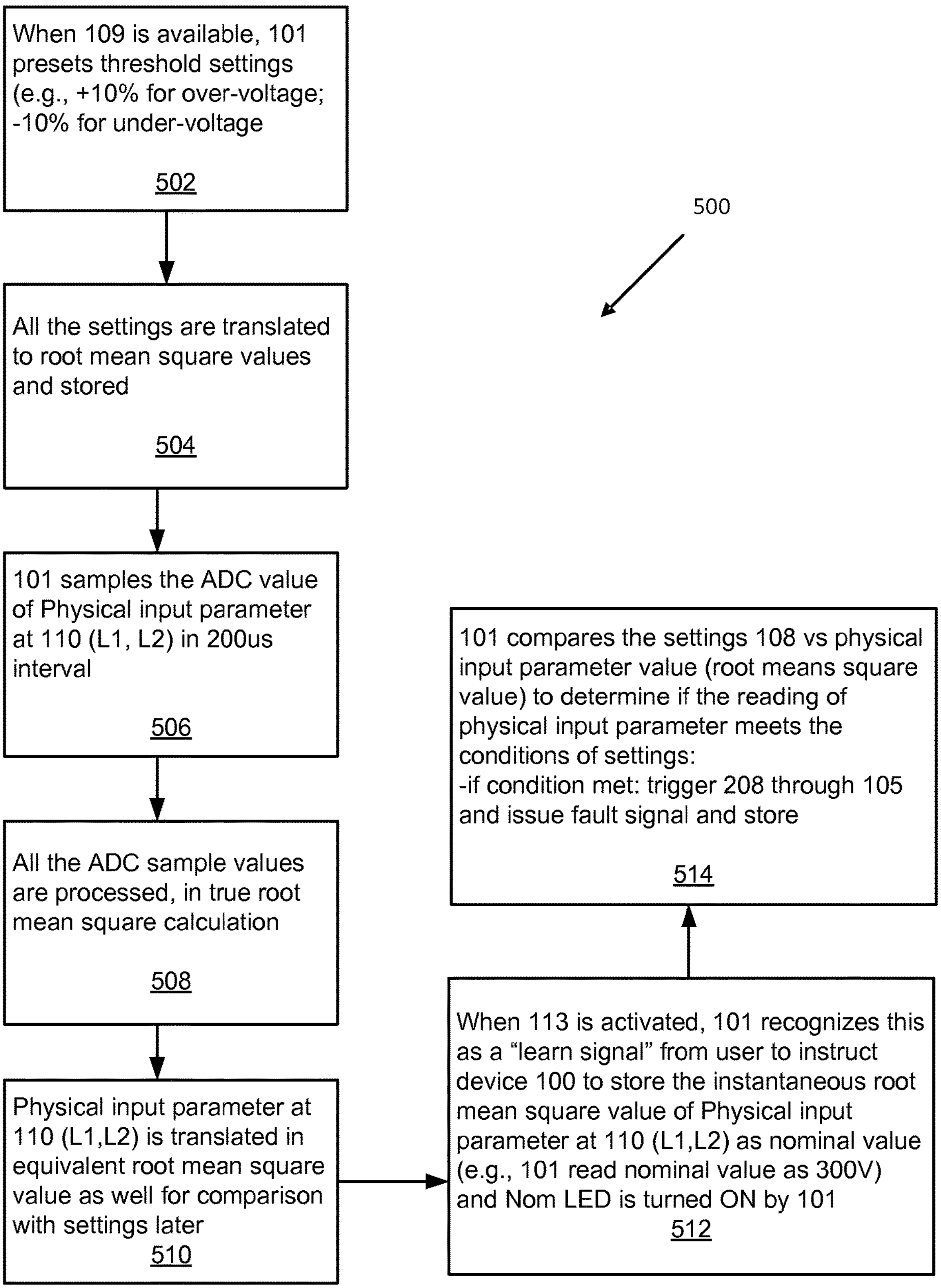
FIG. 5 shows a schematic flow diagram for broadly illustrating an algorithm of an exemplary firmware for the processing module of FIGS. 1(*a*) and 1(*b*) in an example embodiment.

FIG. 5 shows a schematic flow diagram 500 for broadly illustrating an algorithm of an exemplary firmware for the processing module 101 of FIGS. 1(*a*) and 1(*b*) in an example embodiment. It is noted that step 512 may be the first step depending on implementation of how the working condition is obtained by the processing module.

At step 502, when a power supply 109 is available to the relay 100, the processing module 101 reads the threshold settings (e.g. +10% for over-voltage; −10% for under-voltage). At step 504, the threshold settings are translated to root mean square values and stored. At step 506, the processing module 101 samples the analog to digital conversion (ADC) value of the detected parameter value of the source 110 (L1,L2) in 200 uS intervals. At step 508, the ADC sample values are processed, in true root mean square calculations. At step 510, the parameter value of the source 110 (L1,L2) is translated in equivalent root mean square value as well for comparison with the settings later.

At step 512, when it is detected that the teach module 113 is activated, the processing module 101 recognizes the activation as a "learn signal" from a user to instruct the relay 100 to store the instantaneous root means square value of the parameter value of the source 110 (L1,L2) as a nominal value working condition (e.g. the processing module 101 reads nominal value as 300 V) and a Nom LED (a LED signaling normal operations) is turned ON by the processing module 101. At step 514, the processing module 101 compares the threshold settings (e.g. of the user interface 108) with the detected parameter value (root mean square value)

to determine if the reading of the parameter meets the conditions of the settings: If a condition of step 514 is met, the switch element 208 is triggered through the trigger module 105 and a fault signal is issued/transmitted, and can be stored.

Figure 4:
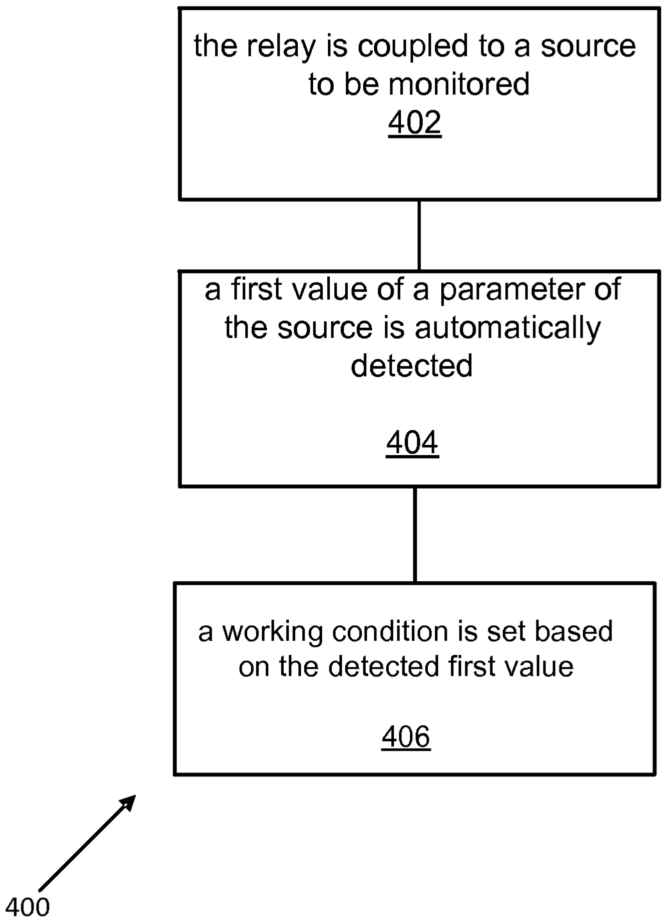
FIG. 4 shows a schematic flowchart illustrating a method for automatic configuration of a relay in an example embodiment.

FIG. 4 shows a schematic flowchart 400 illustrating a method for automatic configuration of a relay in an example embodiment. At step 402, the relay is coupled to a source to be monitored. At step 404, a first value of a parameter of the source is automatically detected. At step 406, a working condition is set based on the detected first value.

In the above described example embodiments, an automatic setting mode can be provided to a user in that the user is not required to set a working condition for a relay. This can advantageously reduce problems associated with manual setting of e.g. working conditions. This can also provide a plug-n-play device for inexperienced users. Such a device can enhance user-friendliness and have simplified user interfaces. Furthermore, a toggle can be provided to allow the user to carry out some manual adjustment/fine-tuning. Thus, optimisation can be carried out if needed by the user. The inventors have recognised that the described example embodiments can be applied to control relays and timer relay products such that a larger number of users can be attracted to using such devices.

It will be understood, however, that the present disclosure may be practiced without necessarily providing one or more of the advantages described herein or otherwise understood in view of the disclosure and/or that may be realized in some embodiments thereof. It will be appreciated by a person skilled in the art that other variations and/or modifications may be made to the specific embodiments without departing from the spirit or scope of the present disclosure as broadly described. The present embodiments are, therefore, to be considered in all respects to be illustrative and not restrictive. The present embodiments are, therefore, to be considered in all respects as illustrative and not restrictive of the present disclosure, which should be defined in accordance with the claims that follow.

What is claimed is:

1. A relay comprising:

an input sampling module configured to automatically detect a first value of a parameter of a source to be monitored;

a processing module configured (i) to set in the relay a working condition for said parameter of the source, wherein the working condition is a value with a dimensional quantity of the parameter, the first value has said dimensional quantity, and the value of the working condition set in the relay is determined automatically from the detected first value and represents the nominal value of the parameter during normal operation of the source; (ii) to set a working range based on applying one or more threshold levels to the set working condition; and (iii) to, after the working range is set, monitor the parameter, wherein the processing module is capable of instructing a trigger module for transmitting a trigger signal from the relay if a detected second value of the parameter being monitored is outside the working range; and wherein the parameter comprises one or more parameter selected from a group consisting of three phase voltage, single phase voltage, single phase current, phase angle, phase frequency, power, temperature, resistance, and digital signals.

2. The relay as claimed in claim 1, further comprising a switch element, wherein the trigger signal switches on/off the switch element of the relay.

3. The relay as claimed in claim 1, wherein the threshold level is set by a user.

4. The relay as claimed in claim 1, wherein the threshold level is set based on a predetermined value.

5. The relay as claimed in claim 1, wherein the processing module sets the working condition based on an instructional input.

6. The relay as claimed in claim 5, wherein the instructional input is based on a user activation.

7. The relay as claimed in claim 5, wherein the instructional input is based on a powering up of the relay.

8. The relay as claimed in claim 1, further comprising a toggle configured to allow a user to adjust the working condition.

9. The relay as claimed in claim 1, further comprising a display configured to display a fault based on the trigger signal.

10. The relay as claimed in claim 1, further comprising a storage module for storing the working condition.

11. A method for automatically configuring a relay, the method comprising:

coupling the relay to a source to be monitored;

automatically detecting a first value of a parameter of the source; and setting in the relay a working condition for said parameter of the source, wherein the working condition is a value with a dimensional quantity of the parameter, the first value has said dimensional quantity, and the value of the working condition set in the relay is determined automatically from the detected first value and represents the nominal value of the parameter during normal operation of the source;

setting a working range based on automatically applying one or more threshold levels to the set working condition; and after setting the working range, monitoring the parameter, and transmitting a trigger signal from the relay if a detected second value of the parameter being monitored is outside the working range;

wherein the parameter comprises one or more parameter selected from a group consisting of three phase voltage, single phase voltage, single phase current, phase angle, phase frequency, power, temperature, resistance, and digital signals.

12. The method as claimed in claim 11, wherein the trigger signal switches on/off a switch element of the relay.

13. The method as claimed in claim 11, wherein the threshold level is set by a user.

14. The method as claimed in claim 11, wherein the threshold level is set based on a predetermined value.

15. The method as claimed in claim 11, wherein the setting of the working condition is based on an instructional input.

16. The method as claimed in claim 15, wherein the instructional input is based on a user activation.

17. The method as claimed in claim 15, wherein the instructional input is based on a powering up of the relay.

18. The method as claimed in claim 11, further comprising displaying a fault based on the trigger signal.

19. The method as claimed in claim 11, further comprising storing the working condition.

20. A non-transitory computer readable data storage medium having stored thereon computer code means for instructing a processing module of a relay to execute a method for automatically configuring the relay, the method comprising:

automatically detecting a first value of a parameter of a source to be monitored; and setting in the relay a working condition for the parameter of the source, wherein the working condition is a value with a dimensional quantity of the parameter, the first value has said dimensional quantity, and the value of the working condition set in the relay is determined automatically from the detected first value and represents the nominal value of the parameter during normal operation of the source;

setting a working range based on automatically applying one or more threshold levels to the set working condition; and after setting the working range, monitoring the parameter, and transmitting a trigger signal from the relay if a detected second value of the parameter being monitored is outside the working range;

wherein the parameter comprises one or more parameter selected from a group consisting of three phase voltage, single phase voltage, single phase current, phase angle, phase frequency, power, temperature, resistance, and digital signals.

* * * * *